United States Patent
Choi et al.

(10) Patent No.: US 9,826,549 B2
(45) Date of Patent: Nov. 21, 2017

(54) METHOD AND APPARATUS FOR TRANSMITTING M2M RANGING INFORMATION IN A WIRELESS COMMUNICATION SYSTEM

(75) Inventors: Jinsoo Choi, Anyang-si (KR); Kiseon Ryu, Anyang-si (KR); Jeongki Kim, Anang-si (KR); Youngsoo Yuk, Anyang-si (KR); Jinsam Kwak, Anyang-si (KR); Hangyu Cho, Anyang-si (KR)

(73) Assignee: LG Electronics Inc., Seoul (KR)

( * ) Notice: Subject to any disclaimer, the term of this patent is extended or adjusted under 35 U.S.C. 154(b) by 98 days.

(21) Appl. No.: 14/129,047

(22) PCT Filed: Mar. 30, 2012

(86) PCT No.: PCT/KR2012/002394
§ 371 (c)(1),
(2), (4) Date: Dec. 23, 2013

(87) PCT Pub. No.: WO2113/008992
PCT Pub. Date: Jan. 17, 2013

(65) Prior Publication Data
US 2014/0146767 A1    May 29, 2014

Related U.S. Application Data

(60) Provisional application No. 61/507,615, filed on Jul. 14, 2011, provisional application No. 61/511,123, filed on Jul. 25, 2011.

(51) Int. Cl.
*H04L 5/00* (2006.01)
*H04W 74/00* (2009.01)
*H04W 4/00* (2009.01)

(52) U.S. Cl.
CPC ......... *H04W 74/004* (2013.01); *H04L 5/0053* (2013.01); *H04L 5/0094* (2013.01); *H04W 4/005* (2013.01); *H04W 74/008* (2013.01)

(58) Field of Classification Search
CPC ... H04W 28/04; H04W 72/04; H04W 72/042; H04W 88/08; H04L 5/0007
(Continued)

(56) References Cited

U.S. PATENT DOCUMENTS 7,515,559 B2 *   4/2009   Koo ................. H04W 36/0055
                                                        370/319
7,664,087 B2 *   2/2010   Cho ..................... H04B 7/2621
                                                        370/208
(Continued)

FOREIGN PATENT DOCUMENTS

CN   101233719 A   7/2008
CN   101404636 A   4/2009

OTHER PUBLICATIONS

Seokki Kim, et al., "Proposed text for M2M ranging channel allocation by UCD message", IEEE 802.16 Broadband Wireless Access Working Group, IEEE C802.16p_11/0141, Jul. 10, 2011.
(Continued)

*Primary Examiner* — Thai Hoang
*Assistant Examiner* — Sanjay K Dewan
(74) *Attorney, Agent, or Firm* — Dentons US LLP

(57) ABSTRACT

A method for transmitting Machine to Machine (M2M) ranging information in a wireless communication system is disclosed. The method includes transmitting an Uplink Channel Descriptor (UCD) including an M2M ranging region Type/Length/Value (TLV). When the UCD is transmitted, a ranging region TLV identifying the same region as the M2M ranging region TLV is included in the UCD.

13 Claims, 9 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 7,912,425 | B2* | 3/2011 | Ihm | H04W 8/30 370/328 |
| 8,130,728 | B1* | 3/2012 | Dinan | H04L 5/0091 370/229 |
| 8,588,085 | B2* | 11/2013 | Kang | H04W 68/025 370/252 |
| 8,693,978 | B2* | 4/2014 | Shi | H04W 4/22 370/328 |
| 8,705,567 | B2* | 4/2014 | Denney et al. | 370/468 |
| 8,711,819 | B2* | 4/2014 | Jeon | 370/338 |
| 8,712,449 | B2* | 4/2014 | Xu | H04W 68/00 455/453 |
| 8,737,989 | B2* | 5/2014 | Luft | H04W 4/00 370/338 |
| 8,971,269 | B2* | 3/2015 | Yu | H04W 72/02 370/329 |
| 9,030,995 | B2* | 5/2015 | Lee | H04W 4/005 370/311 |
| 9,338,796 | B2* | 5/2016 | Choi | H04L 5/0053 |
| 2003/0198179 | A1* | 10/2003 | Koo | H04J 3/0682 370/208 |
| 2005/0041573 | A1* | 2/2005 | Eom | H04W 74/0866 370/208 |
| 2005/0266896 | A1* | 12/2005 | Son et al. | 455/574 |
| 2006/0153131 | A1* | 7/2006 | Kang | H04L 27/2608 370/329 |
| 2006/0239241 | A1* | 10/2006 | Eom | H04W 28/20 370/348 |
| 2008/0298315 | A1* | 12/2008 | Ihm | H04W 8/30 370/329 |
| 2009/0092090 | A1* | 4/2009 | Beems Hart et al. | 370/329 |
| 2010/0111005 | A1* | 5/2010 | Ahn | H04L 5/0007 370/329 |
| 2010/0118772 | A1* | 5/2010 | Cheng | H04L 1/0079 370/328 |
| 2010/0135210 | A1* | 6/2010 | Kim | H04L 1/06 370/328 |
| 2011/0058512 | A1* | 3/2011 | Koo | H04L 5/0037 370/312 |
| 2011/0213871 | A1* | 9/2011 | DiGirolamo | H04W 4/00 709/223 |
| 2011/0228747 | A1* | 9/2011 | Rath et al. | 370/335 |
| 2011/0292892 | A1* | 12/2011 | Sim | H04W 72/0406 370/329 |
| 2012/0030358 | A1* | 2/2012 | MacKenzie | H04W 52/0216 709/226 |
| 2012/0047551 | A1* | 2/2012 | Pattar et al. | 726/1 |
| 2012/0106515 | A1* | 5/2012 | Cho | H04L 5/0053 370/331 |
| 2012/0142268 | A1* | 6/2012 | Tao | H04W 4/08 455/3.05 |
| 2012/0163160 | A1* | 6/2012 | Himayat et al. | 370/216 |
| 2012/0196608 | A1* | 8/2012 | Ting | H04W 74/085 455/450 |
| 2012/0226930 | A1* | 9/2012 | Colban | H04W 72/06 713/340 |
| 2012/0263106 | A1* | 10/2012 | Lee | H04W 4/005 370/328 |
| 2012/0281619 | A1* | 11/2012 | Tao | H04W 4/005 370/328 |
| 2012/0281649 | A1* | 11/2012 | Zhou | H04W 72/02 370/329 |
| 2013/0010593 | A1* | 1/2013 | Cha | H04W 74/006 370/230 |
| 2013/0244652 | A1* | 9/2013 | Park | H04W 74/002 455/435.1 |
| 2013/0258953 | A1* | 10/2013 | Huang | H04W 72/0406 370/329 |
| 2014/0029539 | A1* | 1/2014 | Choi | H04L 27/2602 370/329 |
| 2014/0056229 | A1 | 2/2014 | Li et al. | |
| 2014/0192731 | A1* | 7/2014 | Kim | H04L 5/0053 370/329 |
| 2014/0274082 | A1* | 9/2014 | Huang | H04W 28/20 455/450 |

OTHER PUBLICATIONS

Jaesun Cha, et al., "Separation of Ranging Region", IEEE 802.16 Broadband Wireless Access Working Group, IEEE C802.16p-11/0138, Jul. 10, 2011.

Seokki Kim, et al., "Allocation of ranging channel for M2M", IEEE 802.16 Broadband Wireless Access Working Group, IEEE C802.16-p11/0139, Jul. 10, 2011.

Jinsoo Choi, et al., "Proposed Text for Transmission of Dedicated Ranging Information and Signaling Support for M2M Devices", IEEE 802.16 Broadband Wireless Access Working Group, IEEE C802,16p-11/0168, Jul. 10, 2011.

H. Li et al., "M2M ranging channel indication using UL-MAP for M2M in 16e", IEEE 802.16 Broadband Wireless Acces-Working Group, IEEE C802.16p-11_0160, Jul. 10, 2011.

J. Kim et al., "Clarification on the M2M dedicated ranging region allocated by UL-MAP IE in WirelessMAN-OFDMA", IEEE 802.16 Broadband Wireless Access Working Group, IEEE 802.16p-11/0175, Jul. 10, 2011.

H. Li et al., "M2M ranging channel indication using UL-MAP for M2M in 16e", IEEE 802.16 Broadband Wireless Acces-Norking Group, IEEE C802.16p-11_0090r2, May 18, 2011.

* cited by examiner

METHOD AND APPARATUS FOR TRANSMITTING M2M RANGING INFORMATION IN A WIRELESS COMMUNICATION SYSTEM

TECHNICAL FIELD

The present invention relates to wireless communications, and more particularly, to a method and apparatus for transmitting ranging information related to a Machine to Machine (M2M) device in a wireless communication system.

BACKGROUND ART

Legacy communication is mostly Human to Human (H2H) communication conducted via a Base Station (BS). Now, the development of communication technology enables M2M communication. As its appellation implies, M2M communication is communication between electronic terminals. While M2M communication means wired or wireless communication between electronic terminals or communication between a human-controlled terminal and a machine in its broadest sense, it is typical in these days that M2M communication refers to wireless communication between electronic terminals, i.e. terminals.

When the concept of M2M communication was introduced in the early 1990s, it was regarded merely as the concept of remote control or telematics and its market was very limited. However, M2M communication has been drastically developed and the M2M communication market has attracted much attention all over the world including Korea over the past few years. Especially, M2M communication has a great influence on the fields of fleet management, remote monitoring of machines and facilities, smart metering for automatically measuring the working time of construction equipment and the consumption of heat or electricity, etc. in the market of Point Of Sales (POS) and security-related applications. It is expected that M2M communication will find its various uses in conjunction with legacy mobile communication, very high-speed wireless Internet or Wireless Fidelity (WiFi), and low-output communication solutions such as Zigbee and thus will extend to Business to Customer (B2C) markets beyond Business to Business (B2B) markets.

In the era of M2M communication, every machine equipped with a Subscriber Identity Module (SIM) card can be managed and controlled remotely because it is possible to transmit data to and receive data from the machine. For example, M2M communication is applicable to a very broad range including numerous terminals and equipment such as a car, a truck, a train, a container, an automatic vending machine, a gas tank, etc.

As the application types of M2M devices have been increasing in number, a number of such M2M devices may exist in the same BS. When a huge number of M2M devices in idle state attempt network reentry, connection collisions and congestions increase, thus degrading communication performance. However, there is no specified procedure for performing network reentry in idle state by an M2M device having different characteristics from an existing terminal (H2H terminal).

DISCLOSURE

Technical Problem

An object of the present invention devised to solve the problem lies on a method and apparatus for transmitting information about a Machine to Machine (M2M) ranging region in a wireless communication system.

It will be appreciated by persons skilled in the art that the objects that could be achieved with the present invention are not limited to what has been particularly described hereinabove and the above and other objects that the present invention could achieve will be more clearly understood from the following detailed description taken in conjunction with the accompanying drawings.

Technical Solution

The object of the present invention can be achieved by providing a method for transmitting M2M ranging information at a Base Station (BS) in a wireless communication system, including transmitting an Uplink Channel Descriptor (UCD) including an M2M ranging region Type/Length/Value (TLV). When the BS transmits the UCD, the BS includes a ranging region TLV identifying the same region as the M2M ranging region TLV in the UCD.

In another aspect of the present invention, provided herein is a method for receiving M2M ranging information at an M2M device in a wireless communication system, including receiving a UCD including an M2M ranging region TLV. The UCD includes a ranging region TLV identifying the same region as the M2M ranging region TLV.

In another aspect of the present invention, provided herein is a BS for transmitting M2M ranging information in a wireless communication system, including a Radio Frequency (RF) unit and a processor. The processor controls transmission of a UCD including an M2M ranging region TLV through the RF unit, and when the UCD is transmitted, the processor includes a ranging region TLV identifying the same region as the M2M ranging region TLV in the UCD.

In a further aspect of the present invention, provided herein is an M2M device for receiving M2M ranging information in a wireless communication system, including an RF unit and a processor. The processor receives a UCD including an M2M ranging region TLV through the RF unit, and the UCD includes a ranging region TLV identifying the same region as the M2M ranging region TLV.

The above four technical aspects of the present invention may include all or a part of the followings.

A dedicated ranging indicator may be set to 1 in the ranging region TLV of the UCD.

An M2M ranging region specified by the M2M ranging region TLV may be indicated by an Orthogonal Frequency Division Multiple Access (OFDMA) symbol offset, a subchannel offset, the number of OFDMA symbols, and the number of subchannels.

A ranging region specified by the ranging region TLV may be indicated by an OFDMA symbol offset, a subchannel offset, the number of OFDMA symbols, and the number of subchannels.

If the BS does not include dedicated ranging information in a paging message, a User Equipment (UE) may neglect the ranging region TLV.

A ranging region specified by the M2M ranging region TLV may be used for an M2M device to transmit a ranging code.

Advantageous Effects

According to the embodiments of the present invention, information about an M2M ranging region can be transmitted in a manner that minimizes effects on legacy terminals (H2H terminals) in a wireless communication system.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
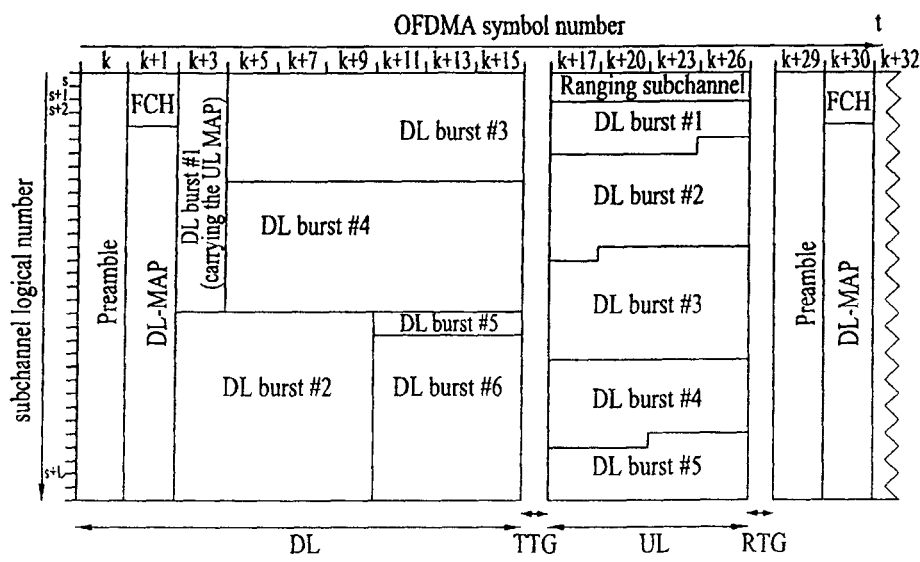
FIG. 1 illustrates a Time Division Duplexing (TDD) frame in an Orthogonal Frequency Division Multiple Access (OFDMA) physical layer.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific details in order to provide a thorough understanding of the present invention. However, it will be apparent to those skilled in the art that the present invention may be practiced without such specific details. For example, the following detailed description is given under the assumption that an Institute of Electrical and Electronics Engineers (IEEE) 802.16 system is being used as a wireless communication system. However, the description is applicable to any other wireless communication system (e.g. Long Term Evolution (LTE)/LTE-Advanced (LTE-A)) except for specific features inherent to the IEEE 802.16 standards.

In some instances, known structures and devices are omitted or are shown in block diagram form, focusing on important features of the structures and devices, so as not to obscure the concept of the invention. The same reference numbers will be used throughout this specification to refer to the same or like parts.

In the following description, the term terminal generically refers to a mobile or fixed user terminal device such as a User Equipment (UE), a Mobile Station (MS), or an Advanced Mobile Station (AMS). In addition, the term Base Station (BS) generically refers to any node at a network end which communicates with a UE, such as a Node B, an evolved Node B (eNode B), an Access Point (AP), an Advanced BS (ABS), etc. The following description is given on the assumption that a UE is an AMS conforming to the IEEE 802.16m standard and a BS is also an ABS conforming to the IEEE 802.16m standard.

In a wireless communication system, a UE can receive information from a BS on a downlink and transmit data to the BS on an uplink. Information transmitted from or received at the UE includes data and various types of control information. There are many physical channels depending on the types and usages of information transmitted from or received at UEs.

A terminal that conducts Machine to Machine (M2M) communication may be referred to as various names such as an M2M device, an M2M communication terminal, and a Machine Type Communication (MTC) terminal. Legacy terminals may be referred to as Human Type Communication (HTC) terminals or Human to Human (HTH) terminals.

As the number of machine application types increases, M2M devices will also be gradually increased in number. Machine application types under consideration are (1) security; (2) public safety; (3) tracking and tracing; (4) payment; (5) healthcare; (6) remote maintenance and control; (7) metering; (8) consumer devices; (9) fleet management in Point Of Sales (POS)-related and security-related application markets; (10) communication between terminals at a vending machine; (11) remote control of machines and facilities and smart metering for automatically measuring the operation time of construction machines and facilities and heat or power consumption; and (12) surveillance video communication, which should not be construed as limiting the present invention. Besides, many other machine application types are being discussed. As machine application types get diversified in this manner, the number of M2M devices is increasing, compared to the number of legacy terminals, that is, H2H terminals.

The existence of numerous M2M devices within the service area of the same BS may cause connection congestions between the M2M devices and the legacy terminals, i.e. H2H terminals and connection collisions between the M2M devices. Accordingly, there exists a need for discussing how efficiently to distribute limited resources to a newly emerged huge number of M2M devices in a manner that minimizes effects on the legacy terminals (H2H terminals).

FIG. 1 illustrates a Time Division Duplexing (TDD) frame in an Orthogonal Frequency Division Multiple Access (OFDMA) physical layer.

Referring to FIG. 1, an IEEE 802.16e frame includes a DownLink (DL) zone and an UpLink (UL) zone. To prevent collision between DL transmission and UL transmission, a Transmit/receive Transition Gap (TTG) is interposed between the DL zone and the UL zone and a Receive/transmit Transition Gap (RTG) is inserted at the end of the frame. The first Orthogonal Frequency Division Multiplexing (OFDM) symbol, of the DL zone is allocated to a preamble for frame synchronization and cell identification. The first four subchannels in the second OFDM symbol include a Frame Control Header (FCH) that provides MAP configuration information. The following subchannels in the second OFDM symbol form a DL-MAP area carrying DL-MAP Information Elements (IEs). A first DL burst (DL burst #1) carries UL-MAP IEs. A ranging subchannel resides in the UL zone. DL bursts and UL bursts carry user data.

Figure 2:
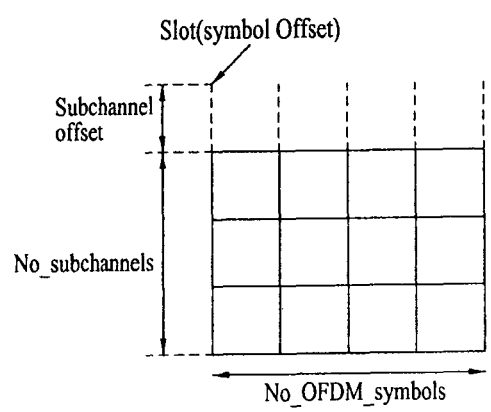
FIG. 2 illustrates a data region for defining OFDMA resource allocation.

FIG. 2 illustrates a data region for defining OFDMA resource allocation. Referring to FIG. 2, a slot allocated to each UE is defined by a two-dimensional data region which is a set of contiguous subchannels allocated by a burst. Namely, one data region in OFDMA may be represented as a rectangle determined by a time coordinate and a subchannel coordinate, as illustrated in FIG. 2.

A data region may be allocated to a specific UE, for UL transmission or DL transmission. To define the data region two-dimensionally, the number of OFDM symbols in the time domain and the number of contiguous subchannels starting from a position apart from a reference point by an offset should be determined.

Figure 3:
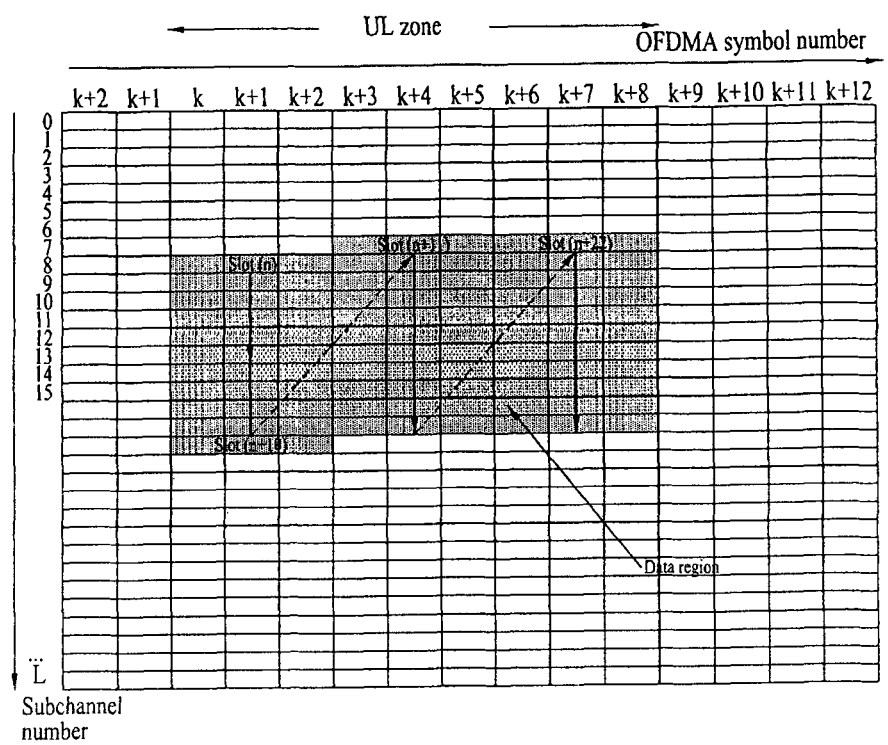
FIG. 3 illustrates an OFDMA data region in an Uplink (UL) zone of a frame.

FIG. 3 illustrates an OFDMA data region in the UL zone of a frame. In the IEEE 802.16e system, a UL OFDMA slot is defined as a square area of one subchannel by three Orthogonal Frequency Division Multiplexing (OFDM) symbols. UL data is divided by the size of one OFDMA slot and the OFDMA slots are sequentially mapped to an OFDMA data region, starting from the lowest-numbered subchannel.

Figure 4:
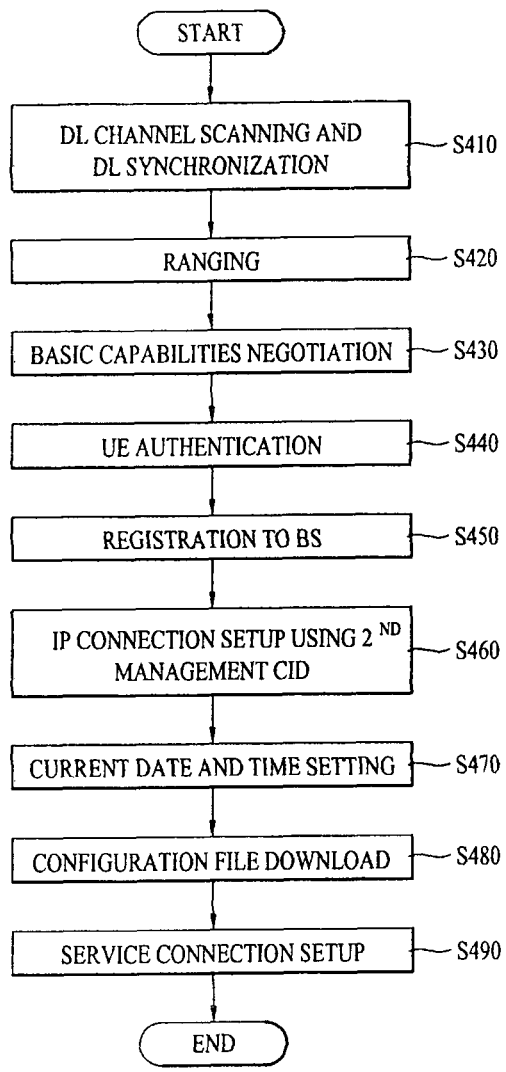
FIG. 4 is a flowchart illustrating an initialization procedure of a User Equipment (UE)

FIG. 4 is a flowchart illustrating an initialization procedure of a UE. Referring to FIG. 4, when the UE is powered on, the UE scans for a DL channel, acquires UL/DL synchronization to a BS, and acquires UL/DL channel parameters by receiving a DL-MAP IE, a UL-MAP IE, a Downlink Channel Descriptor (DCD) message, and an Uplink Channel Descriptor (UCD) message (S410).

The UE adjusts UL transmission parameters through ranging with the BS and is allocated a basic management Connection Identifier (CID) and a primary management CID by the BS (S420). Then the UE performs a basic capabilities negotiation with the BS (S430) and is authenticated (S440).

When the UE is managed by an Internet Protocol (IP) through registration to the BS, it is allocated a secondary management CID by the BS (S450). The UE establishes an IP connection (S460) and sets a current date and time (S470). The UE downloads a configuration file from a Trivial File Transfer Protocol (TFTP) server (S480) and establishes a connection to a prepared service (S490) using the configuration file.

As illustrated in FIG. 4, the process of adjusting transmission parameters (a frequency offset, a time offset, and transmission power) for UL communication with a BS at a UE during initial network registration is called ranging. To maintain UL communication with the BS after the network registration, the UE performs periodic ranging.

Figure 5:
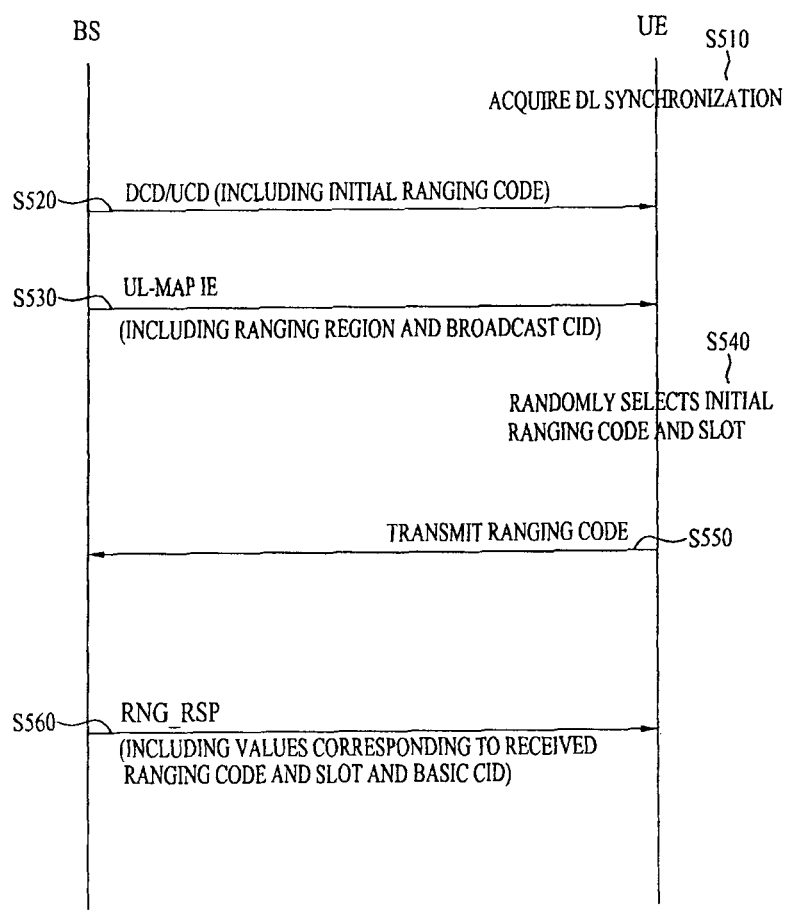
FIG. 5 is a diagram illustrating a signal flow for a ranging procedure.

FIG. 5 is a diagram illustrating a signal flow for a ranging procedure. Referring to FIG. 5, the UE acquires DL synchronization (S510) and receives a UCD message including an initial ranging code (S520). The BS also transmits a UL-MAP IE including information about a ranging region and a broadcast CID to the UE (S530). After randomly selecting a ranging slot in the ranging region indicated by the UL-MAP IE, the UE selects a ranging code randomly from among ranging codes indicated by the UCD message (S540). The UE then transmits the selected ranging code in the selected ranging slot to the BS (S550). Upon receipt of the ranging code, the BS allocates resources to the UE and transmits a Ranging Response (RNG-RSP) message including values corresponding to the received ranging code and slot to the UE (S560).

Now a description will be given of messages/IEs described before with reference to FIGS. 1 to 5. It is clarified that the following description focuses on fields included in each message/IE, related to the embodiments of the present invention.

Table 1 illustrates an exemplary DL-MAP message.

TABLE 1

| Syntax | Size (bit) | Notes |
|---|---|---|
| DL-MAP_Message_Format( ) { | — | — |
| Management Message Type = 2 | 8 | — |
| PHY Synchronization Field | variable | See appropriate PHY specification. |
| DCD Count | 8 | — |
| Base Station ID | 48 | — |
| Begin PHY-specific section { | — | See applicable PHY subclause. |
| if (WirelessMAN-OFDMA) { | — | — |
| No. OFDMA symbols | 8 | For TDD, the number of OFDMA symbols in the DL subframe including all AAS/permutation zone and including the preamble. For FDD, see 8.4.4.2.2. |
| } | — | — |
| for (i = 1; i <= n; i++) { | — | For each DL-MAP element 1 to n. |
| DL-MAP_IE( ) | variable | See corresponding PHY specification. |
| } | — | — |
| } | — | — |
| if !(byte boundary) { | — | — |
| Padding Nibble | 4 | Padding to reach byte boundary. |
| } | — | — |
| } | — | — |

The DL-MAP message defines the usage of each burst allocated to the DL zone in a burst-mode physical layer.

Table 2 illustrates an exemplary UL-MAP message.

TABLE 2

| Syntax | Size (bit) | Notes |
|---|---|---|
| UL-MAP_Message_Format( ) { | — | — |
| Management Message Type = 3 | 8 | — |

TABLE 2-continued

| Syntax | Size (bit) | Notes |
|---|---|---|
| FDD Partition Change Flag | 1 | For FDD only. Indicates the next possible partition change. 0b0: Possible partition change in next frame 0b1: Minimum number of frames (excluding current frame) before next possible change is given by TLV 'FDD frame partition change timer' |
| Reserved | 7 | Shall be set to zero. |
| UCD Count | 8 | — |
| Allocation Start Time | 32 | — |
| Begin PHY-specific section { | — | See applicable PHY subclause. |
|   if (WirelessMAN-OFDMA) { | — | — |
|     No. OFDMA symbols | 8 | For TDD, the number of OFDMA symbols in the UL subframe For FDD, see 8.4.4.2.2 |
|   } | — | — |
|   for (i = 1; i <= n; i++) { | — | For each UL-MAP element 1 to n. |
|     UL-MAP_IE( ) | variable | See corresponding PHY specification. |
|   } | — | — |
| } | — | — |
| if !(byte boundary) { | — | — |
|   Padding Nibble | 4 | Padding to reach byte boundary. |
| } | — | — |
| } | — | — |

The UL-MAP message defines the usage of each burst allocated to the UL zone.

The usage of a UL-MAP IE is determined by an Uplink Interval Usage Code (UIUC) per CID and the time interval of the UL-MAP IE is indicated by a 'duration' field. That is, the usage of each UL-MAP IE is determined by UIUC value and the time interval of the UL-MAP IE starts at a position apart from the previous UL-MAP IE by a duration set in the 'duration' field.

Table 3 illustrates an exemplary DL-MAP IE.

TABLE 3

| Syntax | Size (bit) | Notes |
|---|---|---|
| DL-MAP_IE( ) { | — | — |
|   DIUC | 4 | — |
|   if (DIUC == 14) { | — | — |
|     Extended-2 DIUC dependent IE | — | — |
|   } Else if (DIUC == 15) { | — | — |
|     Extended DIUC dependent IE | variable | See 8.4.5.3.2 and 8.4.5.3.2.1 |
|   } else { | — | — |
|   ... | | |
|     OFDMA Symbol offset | 8 | — |
|     if (Permutation = 0b11 and (AMC type is 2×3 or 1×6)) { | — | — |
|       Subchannel offset | 8 | — |
|       Boosting | 3 | 000: Normal (not boosted); 001: +6 dB; 010: −6 dB; 011: +9 dB; 100: +3 dB; 101: −3 dB; 110: −9 dB; 111: −12 dB; |
|       No. OFDMA triple symbol | 5 | Number of OFDMA symbols is given in multiples of 3 symbols |
|       No. Subchannels | 6 | — |
|     } else { | — | — |
|       Subchannel offset | 6 | — |
|       Boosting | 3 | 000: Normal (not boosted); 001: +6 dB; 010: −6 dB; 011: +9 dB; 100: +3 dB; 101: −3 dB; 110: −9 dB; 111: −12 dB; |
|       No. OFDMA Symbols | 7 | — |
|       No. Subchannels | 6 | — |
|     } | — | — |
|     Repetition Coding Indication | 2 | 0b00: No repetition coding 0b01: Repetition coding of 2 used 0b10: Repetition coding of 4 used 0b11: Repetition coding of 6 used |
|   } | — | — |
| } | — | — |

Referring to Table 3, a DL-MAP IE specifies a DL traffic area for a UE by a Downlink Interval Usage Code (DIUC), a CID, and burst position information such as a subchannel offset, a symbol offset, the number of subchannels, and the number of symbols.

FIG. 4 illustrates an exemplary UL-MAP IE.

TABLE 4

| Syntax | Size (bit) | Notes |
|---|---|---|
| UL-MAP_IE( ) { | — | — |
|   CID | 16 | — |
|   UIUC | 4 | — |
|   if (UIUC == 11) { | — | — |
|     Extended UIUC 2 dependent IE | variable | See 8.4.5.4.4.2 |
|   } | — | — |
|   else if (UIUC == 12) { | — | — |
|     OFDMA Symbol offset | 8 | — |
|     Subchannel offset | 7 | — |
|     No. OFDMA Symbols | 7 | — |
|     No. Subchannels | 7 | — |
|     Ranging Method | 2 | 0b00: Initial ranging/Handover Ranging over two symbols<br>0b01: Initial ranging/Handover Ranging over four symbols<br>0b10: BR/periodic ranging over one symbol<br>0b11: BR/periodic ranging over three symbols |
|     Dedicated ranging indicator | 1 | 0: The OFDMA region and ranging method defined are used for the purpose of normal ranging<br>1: The OFDMA region and ranging method defined are used for the purpose of ranging using dedicated CDMA code and transmission opportunities assigned in the MOB_PAG-ADV message, in the RNG-RSP message, or in the MOB_SCN-RSP message. |
|   . . . | | |
|   Duration | 10 | In OFDMA slots (see 8.4.3.1). |
| . . . | | |

A UL-MAP IE with UIUC=12 allocates a UL region for at least one of the usages of initial ranging, handover ranging, periodic ranging, and bandwidth request ranging, in a contention-based manner.

In OFDMA, a UE performs at least one of a ranging request for adjusting UL transmission parameters and a UL bandwidth request, using a Code Division Multiple Access (CDMA) code. In other words, a BS broadcasts a CDMA code set for one of a ranging request and a UL bandwidth request to UEs by a UCD message. Then the UE randomly selects a ranging code from the CDMA code set according to an intended usage and transmits the selected ranging code in a UL region allocated for ranging.

Both the DCD and UCD are Medium Access Control (MAC) management messages including DL and UL channel parameters, transmitted by the BS. The BS transmits the DCD and UCD to UEs within its service area every predetermined time interval.

The UEs acquire information about a coding and modulation scheme used for each burst from the DCD/UCD message and encode/decode data based on the acquired information. In addition, the UEs determine from the DCD/UCD message whether channel parameters of the BS have been changed and update the channel parameters according to the determination. Meanwhile, the UCD message includes information about a back-off time used to avoid code collision after a CDMA code set and a code related to one of a ranging request and a bandwidth request are transmitted.

The BS allocates a ranging region to UEs in a contention-based manner by a UL-MAP IE. The ranging region may be divided into regions for one or more of initial ranging, handover ranging, periodic ranging, and bandwidth ranging, according to ranging usages.

Meanwhile, an M2M device may perform M2M ranging pursuant to IEEE 802.16e ranging. Notably, a Type/Length/Value (TLV) for M2M communication is defined for an IE or a UCD, when needed. Especially, an M2M ranging region may be indicated by an M2M Ranging Allocation UL-MAP extended IE. The M2M Ranging Allocation UL-MAP extended IE may be defined as illustrated in Table 5.

TABLE 5

| Syntax | Size (bit) | Notes |
|---|---|---|
| Extended UIUC | 4 | M2M Ranging Allocation UL-MAP Extended = 0xC |
| Length | 4 | Length is TBD |
| Access restriction indicator | 1 | When this bit is set to 1, it indicates that M2M devices are not allowed to access this BS.<br>When this bit is set to 0, this IE specifies the ranging allocation for M2M devices. |
| If (Access restriction indicator == 0) { | | |
|   OFDMA Symbol offset | 8 | — |

TABLE 5-continued

| Syntax | Size (bit) | Notes |
| --- | --- | --- |
| Subchannel offset | 7 | — |
| No. OFDMA Symbols | 7 | — |
| No. Subchannels | 7 | — |
| Ranging Method | 2 | 0b00: Initial ranging/Handover Ranging over two symbols<br>0b01: Initial ranging/Handover Ranging over four symbols<br>0b10-0b11: Reserved |
| Dedicated ranging indicator | 1 | 0: The OFDMA region and ranging method defined are used for the purpose of normal ranging<br>1: The OFDMA region and ranging method defined are used for the purpose of ranging using dedicated CDMA code and transmission opportunities assigned in the MOB PAG-ADV message |
| }<br>} | | |

In Table 5, Extended UIUC is set to 0xC indicating that a region indicated by the M2M Ranging Allocated UL-MAP extended IE is used in relation to an M2M dedicated ranging channel. Access restriction indicator indicates whether M2M devices can access the BS. OFDMA Symbol offset indicates the starting OFDMA symbol, Subchannel offset indicates the starting subchannel, No. OFDMA Symbols indicates the number of OFDMA symbols, and No. Subchannels indicates the number of subchannels. Therefore, the M2M ranging region may be indicated by the OFDMA Symbol offset, Subchannel offset, No. OFDMA Symbols, and No. Subchannels. Dedicated ranging indicator indicates whether the ranging region indicated by the above-described four fields and a defined ranging method are used for normal ranging or M2M dedicated ranging.

If an M2M ranging region is indicated by an M2M Ranging Allocation UL-MAP extended IE as illustrated in Table 5, the obscurity problem may occur to the relationship between M2M devices and legacy terminals that do not know the M2M Ranging Allocation UL-MAP extended IE. This will be described in detail with reference to FIG. 6.

Figure 6:
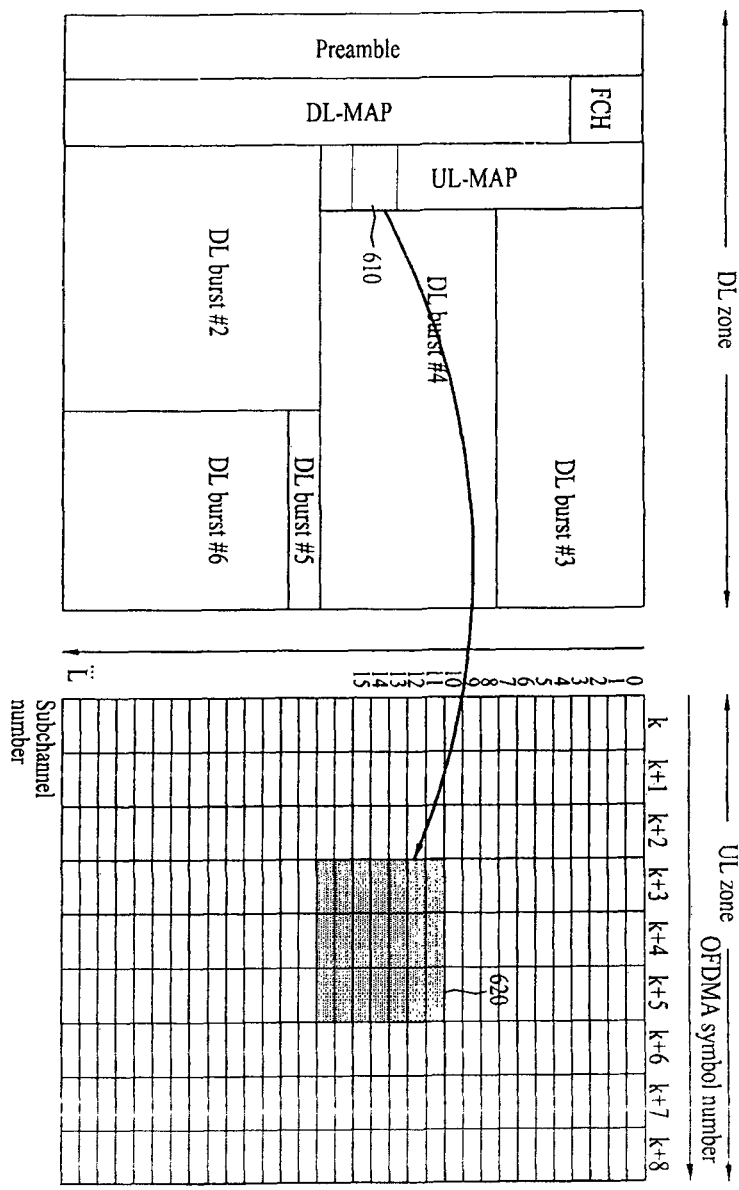
FIG. 6 illustrates an exemplary allocation of a Machine to Machine (M2M) ranging region.

FIG. 6 illustrates exemplary allocation of an M2M ranging region. According to the IEEE 802.16e standard, OFDMA UL-MAP IEs use block allocations as UL bandwidth allocations for fast feedback (UIUC=0), Hybrid Automatic Repeat reQuest (HARQ) ACKnowledgment (ACK) CHannel (CH) region (UIUC=11), CDMA ranging and bandwidth request allocation (UIUC=12), and Peak to Average Power Ratio (PAPR)/safety zone allocation (UIUC=13), and slot allocations for all other UL bandwidth allocations. These signals are allocated to the UL zone, above all other signals. Therefore, a ranging region indicated by an M2M Ranging Allocation UL-MAP extended IE 610 in the UL-MAP area of the DL zone may be allocated in the form of a block 620 in a specific region of the UL zone, as illustrated in FIG. 6. However, the M2M ranging region 620 is merely exemplary and thus various block positions and sizes may be set by OFDMA Symbol offset, Subchannel offset, No. OFDMA Symbols, and No. Subchannels.

Upon receipt of the M2M Ranging Allocation UL-MAP extended IE 610 in the UL-MAP area of the DL zone, a legacy terminal neglects the M2M Ranging Allocation UL-MAP extended IE 610 because it does not know the extended UIUC (=0xC) included in the M2M Ranging Allocation UL-MAP extended IE 610. As a result, the legacy terminal may not determine the position and size of an M2M ranging region in the UL zone, indicated by the M2M Ranging Allocation UL-MAP extended IE 610. Moreover, without knowledge of the length of the M2M ranging region, the legacy terminal has a problem with using slots following the M2M ranging region in the UL zone. Due to this problem, the BS also has difficulty in efficiently allocating resources when allocating an M2M ranging region by the M2M Ranging Allocation UL-MAP extended IE 610.

To solve the above problem, it is proposed that when an M2M ranging region is allocated by the M2M Ranging Allocation UL-MAP extended IE 610, a conventional OFDMA UL-MAP IE is set also to indicate (identify) the same ranging region as the M2M ranging region. Specifically, the OFDMA UL-MAP IE is set to indicate the same ranging region as the M2M ranging region by the OFDMA Symbol offset, Subchannel offset, No. OFDMA Symbols, and No. Subchannel fields. The UIUC is set to 12 to indicate ranging and the Dedicated ranging indicator is set to 1 to indicate dedicated ranging. This will be described below in detail with reference to FIG. 7.

Figure 7:
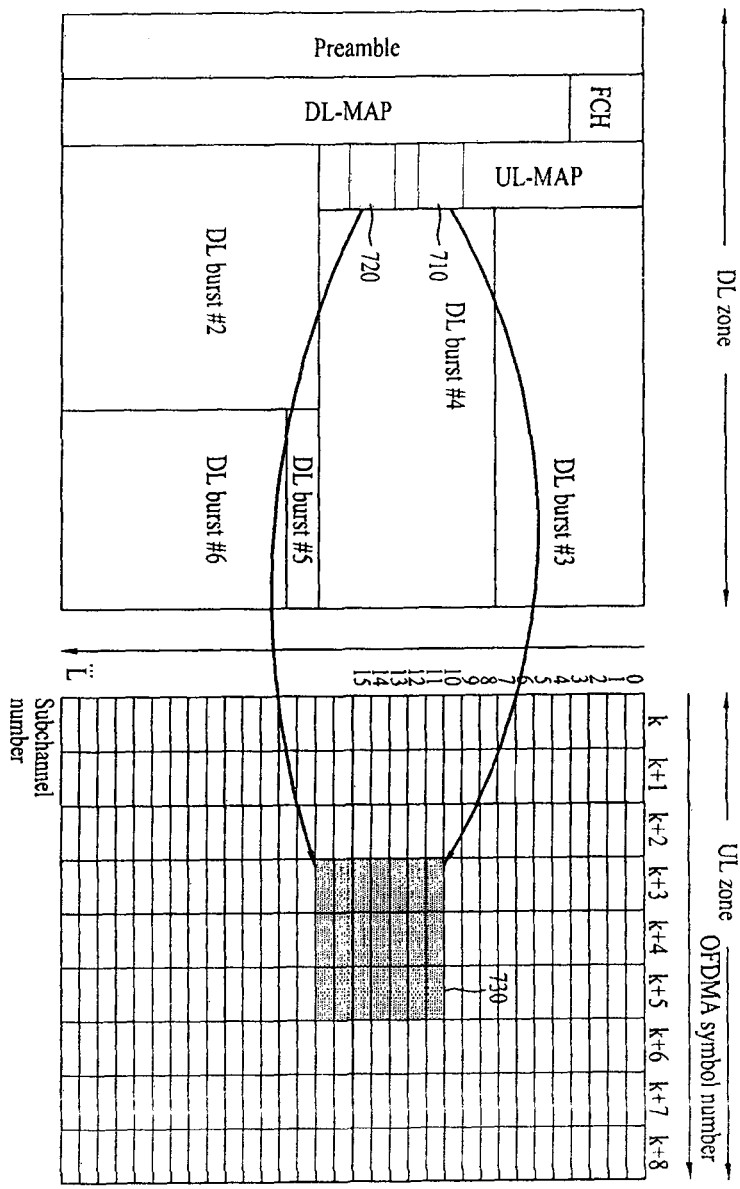
FIG. 7 illustrates allocation of an M2M ranging region according to an embodiment of the present invention.

FIG. 7 illustrates allocation of an M2M ranging region according to an embodiment of the present invention. Referring to FIG. 7, an OFDMA UL-MAP IE 710 and an M2M Ranging Allocation UL-MAP extended IE 720 are defined in the DL MAP area of the DL zone and an M2M ranging region 730 indicated by both the OFDMA UL-MAP IE 710 and the M2M Ranging Allocation UL-MAP extended IE 72 is defined in the UL zone. As noted from FIG. 7, the OFDMA UL-MAP IE 710 and the M2M Ranging Allocation UL-MAP extended IE 720 indicate the same region (i.e. the M2M ranging region 730) in the UL zone.

In this case, an M2M device may determine the M2M ranging region by the M2M Ranging Allocation UL-MAP extended IE 720 and thus may perform ranging in the M2M ranging region. On the other hand, a legacy terminal neglects the M2M Ranging Allocation UL-MAP extended IE 720 because it does not know the meaning of the extended UIUC included in the M2M Ranging Allocation UL-MAP extended IE 720. However, the legacy terminal may recognize the presence of a specific ranging region (e.g. the position, size, etc. of the specific ranging region) by the OFDMA UL-MAP IE 710 indicating the same region as the M2M ranging region.

The legacy terminal may be aware from UIUC=12 that this ranging region is related to ranging and may determine from dedicated ranging indicator=1 that the ranging region is a dedicated ranging region. Notably, since the OFDMA UL-MAP IE 710 is not intended to allocate a dedicated ranging region to the legacy terminal, the BS does not transmit another MAC management message related to dedicated ranging (e.g. a paging message specifying a dedicated ranging code and a transmission opportunity).

Therefore, the legacy terminal is not capable of using the ranging region indicated by the OFDMA UL-MAP IE 710, for dedicated ranging. Nonetheless, the legacy terminal may know the same ranging region as the M2M ranging region, indicated by the OFDMA UL-MAP IE 710 and thus no problem occurs with the legacy terminal's recognition and use of the following regions. If the BS does not include dedicated raging information in a paging message, the legacy terminal may be supposed to neglect ranging region information set in the OFDMA UL-MAP IE. In addition, the BS may include in a UCD message an indicator indicating whether an M2M device can use the ranging region information set in the OFDMA UL-MAP IE.

In summary, when information about an M2M ranging region is transmitted in an M2M Ranging Allocation UL-MAP extended IE, an OFDMA UL-MAP IE with UIUC=12 and dedicated ranging indicator=1 is transmitted to indicate the same ranging region as the M2M ranging region so as to actively support ranging of M2M devices, while protecting legacy terminals.

The UCD may also face the afore-described problem related to legacy terminals, caused by transmission of the M2M Ranging Allocation UL-MAP extended IE. To solve the problem, when an M2M ranging region TLV is transmitted in the UCD, a ranging region TLV indicating (identifying) the same region as an M2M ranging region may be allocated, which will be described below in great detail. M2M ranging region information may be indicated by OFDMA symbol offset, Subchannel offset, No. OFDMA Symbols, and No. Subchannels in the M2M ranging region TLV of Table 6 illustrating a part of the UCD.

TABLE 6

| Name | Type (1 byte) | Length | Value |
|---|---|---|---|
| Uplink_Burst_Profile | 1 | | May appear more than once (see 6.3.2.3.3). The length is the number of bytes in the overall object, including embedded TLV items. |
| Contention-based reservation timeout | 2 | 1 | Number of UL-MAPs to receive before contention-based reservation is attempted again for the same connection. |
| Frequency | 5 | 4 | UL center frequency (kHz). |
| HO_ranging_start$^a$ | 7 | 1 | Initial backoff window size for MS performing initial ranging during HO process, expressed as a power of 2. Range: 0-15 (the highest order bits shall be unused and set to 0). |
| Available UL Radio Resources | 24 | 1 | Indicates the average ratio of non-assigned UL radio resources to the total usable UL radio resources. The average ratio shall be calculated over a time interval defined by the UL_radio_resources_window_size parameter (Table 342). The reported average ratio will serve as a relative load indicator. This value can be biased by the operator provided it reflects a consistent representation of the average loading condition of BSs across the operator network. 0x00: 0% 0x01: 1% . . . 0x64: 100% 0x65-0xFE: reserved, 0xFF indicates no information available |
| M2M Ranging Region | 31 | 6/12 | The value of TLV consists of up to two concatenated sections (one section per Ranging method), each having the following structure: Bit 0: dedicated ranging indicator. indicating an M2M ranging region allocated for M2M devices only Bits 1-2: ranging method Bits 3-9: num subchannels Bits 10-16: num OFDMA symbols Bits 17-23: subchannel offset Bits 24-31: OFDMA symbol offset Bits 32-34: Parameter d that defines periodicity of $2^d$ frames Bits 35-39: Allocation phase expressed in frames. $0 \leq$ Allocation Phase $<$ periodicity($= 2^d$) Bits 40-47: Reserved |

In this case, Ranging Region is set to indicate the same region as M2M Ranging Region in Table 7 illustrating a part of a UCD with TLV=212.

TABLE 7

| Name | Type (1 byte) | Length | Value |
|---|---|---|---|
| . . . | | | |
| Ranging Region | 212 | 5/10/15/20 | The value of TLV consists of up to four concatenated sections (one section per Ranging method), each having the following structure: Bit 0: dedicated ranging indicator Bits 1-2: ranging method |

TABLE 7-continued

| Name | Type (1 byte) | Length | Value |
|---|---|---|---|
| | | | Bits 3-9: num subchannels<br>Bits 10-16: num OFDMA. symbols.<br>Bits 17-23: subchannel offset<br>Bits 24-31: OFDMA symbol offset<br>Bits 32-34, Parameter d that defines periodicity of $2^d$ frames<br>Bits 35-39, Allocation phase expressed in frames, $0 \leq$ Allocation Phase $<$ periodicity $(=2^d)$ |
| ... | | | |

Figure 8:
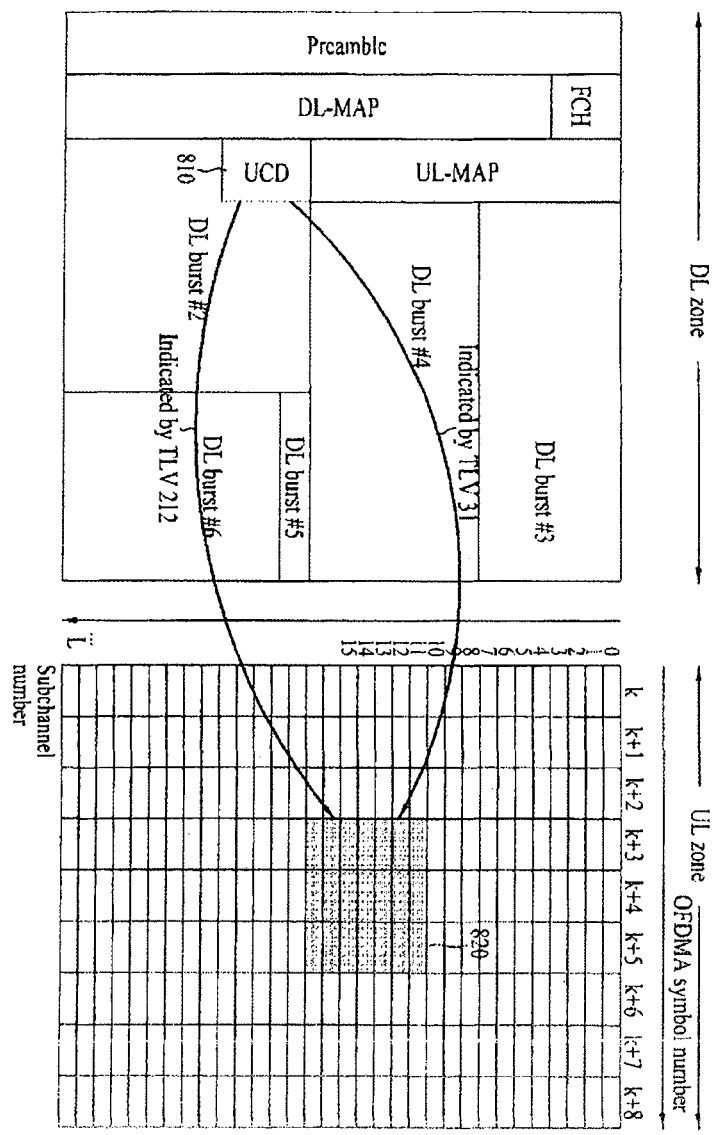
FIG. 8 illustrates allocation of an M2M ranging region according to another embodiment of the present invention.

Referring to Table 7, among values that define a ranging region, OFDMA symbol offset, Subchannel offset, No. OFDMA Symbols, and No. Subchannels are set to the same values as those of the fields of TLV 31. That is, TLV 31 and TLV 212 in a UCD 810 are set to indicate the same ranging region 820, as illustrated in FIG. 8. In TLV 212, the dedicated ranging indicator is set to 1. In this manner, ranging of M2M devices can be actively supported, while protecting legacy terminals, based on the same principle of the case of using the M2M Ranging Allocation UL-MAP extended IE.

Figure 9:
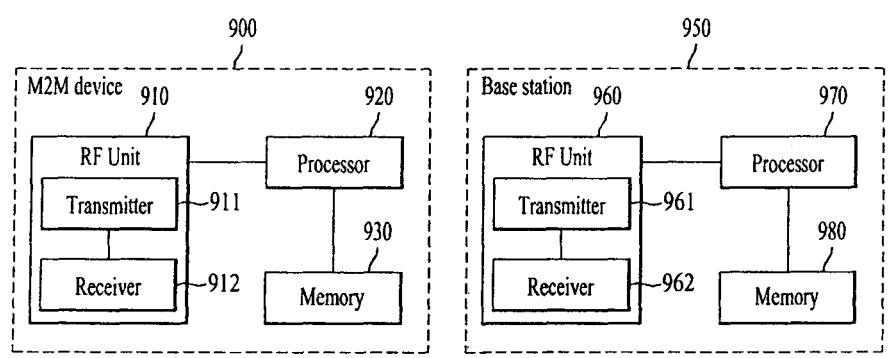
FIG. 9 is a block diagram of an M2M device and a Base Station (BS) according to an embodiment of the present invention.

FIG. 9 is a block diagram of an M2M device and a BS according to an embodiment of the present invention.

Referring to FIG. 9, an M2M device 900 and a BS 950 may include Radio Frequency (RF) units 910 and 960, processors 920 and 970, and memories 930 and 980, respectively. Each RF unit 910 or 960 may include a transmitter 911 or 961 and a receiver 912 or 962.

The transmitter 911 and the receiver 912 of the M2M device 900 are configured so as to transmit signals to and receive signals from the BS 950 and another M2M device. The processor 920 is functionally connected to the transmitter 911 and the receiver 912 to control signal transmission and reception to and from other terminals through the transmitter 911 and the receiver 912.

The processor 920 processes a transmission signal and then transmits the processed signal to the transmitter 911. The processor 920 also processes a signal received from the receiver 912. When needed, the processor 920 may store information included in exchanged messages in the memory 930. The M2M device 900 having the above-described configuration may implement the methods according to the foregoing embodiments of the present invention.

While not shown in FIG. 9, the M2M device 900 may further include many other components according to its application type. If the M2M device 900 is designed for smart metering, it may further include a component for power measuring. The power measuring operation may be performed under the control of the processor 920 or a separately procured processor (not shown).

While communication is conducted between the M2M device 900 and the BS 950 in the illustrated case of FIG. 9, M2M communication may also be performed between M2M devices according to the present invention. Each terminal having the same configuration illustrated in FIG. 9 may perform the methods according to the foregoing embodiments of the present invention.

Meanwhile, the transmitter 961 and the receiver 962 of the BS 950 are configured to transmit signals to and receive signals from another BS, an M2M server, and M2M devices. The processor 970 is functionally connected to the transmitter 961 and the receiver 962 to thereby control signal transmission and reception to and from other terminals through the transmitter 961 and the receiver 962.

The processor 970 processes a transmission signal and then transmits the processed signal to the transmitter 961. The processor 970 also processes a signal received from the receiver 962. When needed, the processor 970 may store information included in an exchanged message in the memory 980. The BS 950 having this configuration may perform the methods according to the foregoing embodiments of the present invention.

The processors 920 and 970 of the M2M device 900 and the BS 950 command (e.g. control, adjust, and manage) operations of the M2M device 900 and the BS 950, respectively. The processors 920 and 970 may be connected respectively to the memories 930 and 980 that store program codes and data.

The memories 930 and 980 are connected to the processors 920 and 970 and store an Operating System (OS), applications, and general files.

The processors 920 and 970 may also be called controllers, microcontrollers, microprocessors, or microcomputers. Meanwhile, the processors 920 and 970 may be implemented by various means, for example, hardware, firmware, software, or a combination thereof. In a hardware configuration, the processors 920 and 970 may include one or more Application Specific Integrated Circuits (ASICs), Digital Signal Processors (DSPs), Digital Signal Processing Devices (DSDPs), Programmable Logic Devices (PLDs), Field Programmable Gate Arrays (FPGAs), etc. which are configured to implement the present invention.

In a firmware or software configuration, the embodiments of the present invention may be implemented in the form of a module, a procedure, a function, etc. Firmware or software configured to implement the present invention may be included in the processors 920 and 970, or may be stored in the memories 930 and 980 and executed by the processors 920 and 970.

MODE FOR INVENTION

Various embodiments have been described in the best mode for carrying out the invention.

INDUSTRIAL APPLICABILITY

The network reentry methods of an M2M device are applicable to various wireless communication systems including 3$^{rd}$ Generation Partnership Project (3GPP) Long Term Evolution-Advanced (LTE-A) and IEEE 802.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an exemplary embodiment of the present invention or included as a new claim by a subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The invention claimed is:

1. A method for transmitting Machine to Machine (M2M) ranging information at a Base Station (BS) in a wireless communication system, the method comprising:
transmitting an Uplink Channel Descriptor (UCD) including both a ranging region field configured with a first type of configuration for ranging of a non-M2M device and a M2M ranging region field configured with a second type of configuration for ranging of a M2M device, the M2M ranging region field indicating a M2M ranging region and the ranging region field for the non-M2M device identifying the same M2M ranging region as the M2M ranging region field for the M2M device in the UCD;
receiving a ranging code from the M2M device in the M2M ranging region; and
transmitting ranging information via a paging message to the M2M device, wherein the ranging region field is neglected by the non-M2M device, the base station does not receive a ranging code from the non-M2M device in the ranging region, and the ranging information in the paging message is not transmitted to the non-M2M device.

2. The method according to claim 1, wherein a dedicated ranging indicator is set to 1 in the ranging region field of the UCD.

3. The method according to claim 1, wherein the M2M ranging region specified by the M2M ranging region field is indicated by an Orthogonal Frequency Division Multiple Access (OFDMA) symbol offset, a subchannel offset, the number of OFDMA symbols, and the number of subchannels.

4. The method according to claim 1, wherein the M2M ranging region specified by the ranging region field is indicated by an OFDMA symbol offset, a subchannel offset, the number of OFDMA symbols, and the number of subchannels.

5. The method according to claim 1, wherein the M2M ranging region specified by the M2M ranging region field is used for the M2M device to transmit a ranging code.

6. A method for receiving Machine to Machine (M2M) ranging information at an M2M device in a wireless communication system, the method comprising:
receiving an Uplink Channel Descriptor (UCD) including both a ranging region field configured with a first type of configuration for ranging of a non-M2M device and a M2M ranging region field configured with a second type of configuration for ranging of the M2M device, the M2M ranging region field indicating a M2M ranging region and the ranging region field for the non-M2M device identifying the same M2M ranging region as the M2M ranging region field for the M2M device;
transmitting a ranging code in the M2M ranging region; and
receiving ranging information via a paging message, wherein the ranging region field is neglected by the non-M2M device, the base station does not receive a ranging code from the non-M2M device in the ranging region, and the ranging information in the paging message is not transmitted to the non-M2M device.

7. The method according to claim 6, wherein a dedicated ranging indicator is set to 1 in the ranging region field of the UCD.

8. The method according to claim 6, wherein the M2M ranging region specified by the M2M ranging region field is indicated by an Orthogonal Frequency Division Multiple Access (OFDMA) symbol offset, a subchannel offset, the number of OFDMA symbols, and the number of subchannels.

9. The method according to claim 6, wherein the M2M ranging region specified by the ranging region field is indicated by an OFDMA symbol offset, a subchannel offset, the number of OFDMA symbols, and the number of subchannels.

10. The method according to claim 6, wherein the non-M2M device does not receive the paging message including the ranging information, and the non-M2M device neglects the ranging region field.

11. The method according to claim 6, further comprising transmitting a ranging code using M2M ranging region field set by the M2M ranging region field.

12. A Base Station (BS) for transmitting Machine to Machine (M2M) ranging information in a wireless communication system, the BS comprising:
a Radio Frequency (RF) unit; and
a processor that controls the RF unit to:
transmit an Uplink Channel Descriptor (UCD) including both a ranging region field configured with a first type of configuration for ranging of a non-M2M device and a M2M ranging region field configured with a second type of configuration for ranging of a M2M device, the M2M ranging region field indicating a M2M ranging region and the ranging region field for the non-M2M device identifying the same M2M ranging region as the M2M ranging region field for the M2M device in the UCD,
receive a ranging code from the M2M device in the M2M ranging region; and
transmit ranging information via a paging message to the M2M device, wherein the ranging region field is neglected by the non-M2M device, the base station does not receive a ranging code from the non-M2M device in the ranging region, and the ranging information in the paging message is not transmitted to the non-M2M device.

13. A Machine to Machine (M2M) device for receiving M2M ranging information in a wireless communication system, the M2M device comprising:
a Radio Frequency (RF) unit; and
a processor that controls the RF unit to:
receive an Uplink Channel Descriptor (UCD) including both a ranging region field having a first type of configuration for ranging of a non-M2M device and a M2M ranging region field having a second type of configuration for ranging of the M2M device, the M2M ranging region field indicating a M2M ranging region and the ranging region field for the non-M2M device identifying the same M2M ranging region as the M2M ranging region field for the M2M device, transmit a ranging code in the ranging region; and receive ranging information via a paging message, wherein the ranging region field is neglected by the non-M2M device, the base station does not receive a ranging code from the non-M2M device in the ranging region, and the ranging information in the paging message is not transmitted to the non-M2M device, and the non-M2M device neglects the ranging region field.

* * * * *